(12) United States Patent
Ok

(10) Patent No.: US 7,952,656 B2
(45) Date of Patent: May 31, 2011

(54) BACKLIGHT ASSEMBLY AND LIQUID CRYSTAL DISPLAY INCLUDING THE SAME

(75) Inventor: Min-Ho Ok, Hwaswong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 181 days.

(21) Appl. No.: 12/147,033

(22) Filed: Jun. 26, 2008

(65) Prior Publication Data

US 2009/0091683 A1 Apr. 9, 2009

(30) Foreign Application Priority Data

Oct. 8, 2007 (KR) .................. 10-2007-0100993

(51) Int. Cl.
*G02F 1/1333* (2006.01)
*F21S 4/00* (2006.01)
(52) U.S. Cl. .................... 349/58; 362/224; 362/225

(58) Field of Classification Search .................. None
See application file for complete search history.

(56) References Cited

U.S. PATENT DOCUMENTS

| 4,526,433 | A | * | 7/1985 | Tanaka .................. 439/301 |
| 4,949,007 | A | * | 8/1990 | Takagi et al. ............ 313/318.02 |
| 7,549,880 | B2 | * | 6/2009 | Miyazono et al. ......... 439/232 |
| 2005/0243548 | A1 | * | 11/2005 | Yamashita et al. .......... 362/225 |

\* cited by examiner

*Primary Examiner* — Hemang Sanghavi
(74) *Attorney, Agent, or Firm* — F. Chau & Associates, LLC

(57) ABSTRACT

A backlight assembly generating less noise after power is turned ON or OFF, and a liquid crystal display device comprising the backlight assembly. The backlight assembly includes an alignment plate having a plurality of socket insertion holes each having socket insertion hole sidewalls, wherein at least one projection is formed on an inner surface of a socket insertion hole sidewall. An outer surface of a socket inserted into the socket insertion hole comes into physical contact with the projection.

14 Claims, 22 Drawing Sheets

BACKLIGHT ASSEMBLY AND LIQUID CRYSTAL DISPLAY INCLUDING THE SAME

CROSS-REFERENCE TO RELATED APPLICATION

This application claims priority, under 35 USC §119, of Korean Patent Application No. 10-2007-0100993 filed on Oct. 8, 2007, in the Korean Intellectual Property Office, which is incorporated herein by reference in its entirety.

BACKGROUND OF THE INVENTION

1. Field of the Invention

The present invention relates to a backlight assembly and a liquid crystal display device comprising the same, and, more particularly, to a backlight assembly that generates relatively less noise after power is turned ON or OFF, and a liquid crystal display device including the same.

2. Description of the Related Art

Liquid crystal displays (LCDs) are one of the most popular flat panel displays. An LCD, includes two panels having a plurality of electrodes thereon and a liquid crystal layer interposed between the two panels. The LCD controls the transmittance of incident light through the liquid crystal layer by applying voltages to the electrodes to rearrange liquid crystal molecules in the liquid crystal layer.

Liquid crystal displays typically include a backlight assembly for supplying light through the liquid crystal layer. The backlight assembly includes lamps, various types of optical (e.g., light diffusing, light transmitting) sheets, and a housing for receiving the lamps and the optical sheets. In addition, sockets are used to fasten the lamps into the housing. Conventional liquid crystal displays use a plurality of lamps arranged in an ordered fashion, an alignment plate is used for attaching sockets coupled to the lamps to the housing. Thus, after being inserted into holes formed in a housing, the sockets are attached to the housing with an alignment plate.

As described above, when a separate alignment plate is used to attach a socket to a housing, a gap is created between the assembled socked and the alignment plate. After power has been turned ON or OFF, the components warm up to an operating temperature or cool down to room temperature and during that time interval a difference in the thermal expansion coefficients of the socket and of the alignment plate may cause a slip phenomenon between the socket and the alignment plate, thereby generating noise.

It is desirable to reduce noise generated by a backlight assembly after power is turned ON or OFF.

SUMMARY OF THE INVENTION

An aspect of present invention provides a backlight assembly generating less noise after power is turned ON or OFF.

Another aspect of the present invention also provides a liquid crystal display device including the backlight assembly generating less noise after power is turned ON or OFF.

According to an aspect of the present invention, there is provided a backlight assembly including an alignment plate having a plurality of socket insertion holes having socket insertion hole sidewalls, a socket inserted in each of the plurality of socket insertion holes, and a bottom chassis to which the alignment plate is attached, wherein at least one projection is formed on inner surfaces of the socket insertion hole sidewalls and outer surfaces of the socket come into contact with the at least one projection.

According to another aspect of the present invention, there is provided a backlight assembly including an alignment plate having a plurality of socket insertion holes having socket insertion hole sidewalls, a socket fixed to each of the plurality of socket insertion holes, and a bottom chassis to which the alignment plate is fixed, wherein at least one projection is formed on outer surfaces of the socket and inner surfaces of the socket insertion hole sidewalls contact the at least one projection.

The features of the present invention and methods of implementing the invention may be understood more readily by reference to the following detailed description of preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Spatially relative terms, such as "downward", "lower," "above," "upwards" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

BRIEF DESCRIPTION OF THE DRAWINGS

The above and other features of the present invention will become apparent to persons skilled in the art by describing in detail exemplary embodiments thereof with reference to the attached drawings in which.

DETAILED DESCRIPTION OF EXEMPLARY EMBODIMENTS OF THE INVENTION

Figure 1:
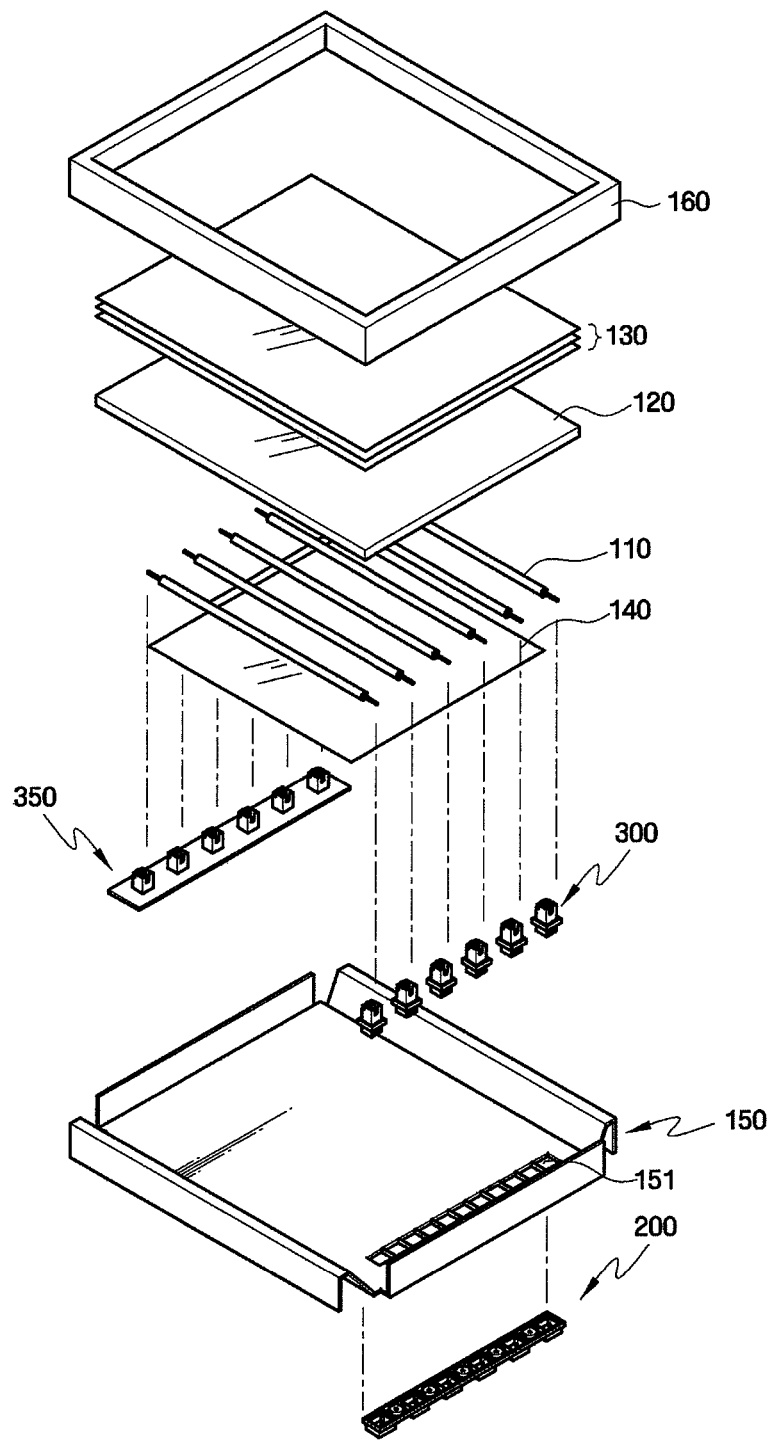
FIG. 1 is an exploded perspective view illustrating a backlight assembly according to a first exemplary embodiment of the present invention.

FIG. 1 is an exploded perspective view of a backlight assembly according to a first embodiment of the present invention. Referring to FIG. 1, the backlight assembly includes at least one (e.g., a plurality of) lamps 110, an optical diffusion plate 120, optical sheets 130, a reflective plate 140, a first container 150, a second container 160, an alignment plate 200, and at least one socket 300.

The lamps 110 may be CCFLs (Cold Cathode Fluorescent Lamps), EEFLs (External Electrode Fluorescent Lamps), or other types. The lamps 110 generate light by conducting a lamp-driving voltage applied across the lamp at connection terminals at each end of the lamp from an external source. The lamps 110 are preferably spaced equally apart from each other and positioned in parallel to each other in the same plane. The lamps 110 may form a direct-type lamp structure. In order to achieve uniformity of brightness by uniformly distributing a discharge gas in the lamps 110, the lamps 110 are preferably arranged in parallel with a longer side of the first container 150. The ends of each lamp 110 are inserted into a first socket 300 and a second (ground) socket 350 and are thus securely supported (described later).

The diffusion plate 120 may be disposed above the lamps 110, and serves to enhance the brightness uniformity of light emitted from the lamps 110.

The optical sheets 130 may be disposed on the diffusion plate 120, and serves to distribute and collect the light transmitted from the lamps 110. The optical sheets 130 may include a diffusion sheet, a first prism sheet, a second prism sheet, and others.

The first prism sheet is disposed on the diffusion plate 120. Trigonal prism patterns (not shown) are uniformly arranged on a surface of the first prism sheet to focus light diffused from the diffusion plate and to scatter the focused light. The second prism sheet is disposed on the first prism sheet, and is a multi-layered, reflective, polarizing prism sheet for focusing, polarizing, and outputting light. If the first prism sheet can guarantee sufficient brightness and viewing angle and polarization, the second prism sheet may be omitted.

The reflective sheet 140 is disposed below the lamps 110 and reflects downward emitted light upward from below the lamps 110. The reflective plate 140 may be formed integrally with the bottom surface of the first housing 150. Thus, if the first housing 150 is made of or mirror-coated with a highly reflective material such as chromium, aluminum (Al) or aluminum alloy, the first housing 150 can serve as the reflective plate 140.

The first container 150 has a rectangular bottom surface, and securely receives the lamps 110, the diffusion plate 120, the optical sheets 130, and reflective sheet 140 in an area defined by its sidewalls extending upward from the edges of its rectangular bottom surface. An opening 151 for the first socket 300 of each lamp 110 is formed on the bottom surface of the first container 150, and each first socket 300 is inserted into the corresponding opening 151 from above the first container 150. Each first socket 300 is inserted becomes attached to the alignment plate 200 disposed below the first container 150. The first socket 300 and the alignment plate 200 will later be described in more detail later.

A pair of sidewalls formed along the longer sides of the first container 150 may include bending portions to mount the second container 160 or to be fastened with a top chassis (not shown). In contrast, a pair of sidewalls formed along the shorter sides of the first container 150 may not include bending portions.

The second container 160 covers an upper surface of optical sheets 130 received in the first container 150. A window, through which the light emitted from the lamps 110 passes toward a liquid crystal panel assembly, is disposed in a central portion of the second container 160.

The mechanical coupling between the first container 150 and the second container 160 can be accomplished by hooking (not shown) and/or screwing (not shown). The mechanical coupling between the first container 150 and the second container 160 may also be achieved in various other ways known to persons skilled in the art. In the present embodiment, the first container 150 and the second container 160 are may also be referred to as a bottom chassis and a middle mold, respectively, and the terms can be interchangeably used.

In addition, although not shown, a lower mold for protecting the lamps 110 and housing the diffusion plate 120, and others, may be disposed along the edge of the first container 150.

Hereinafter, an alignment plate according to a first exemplary embodiment of the present invention will be described in detail with reference to FIGS. 2 and 3.

Figure 2:
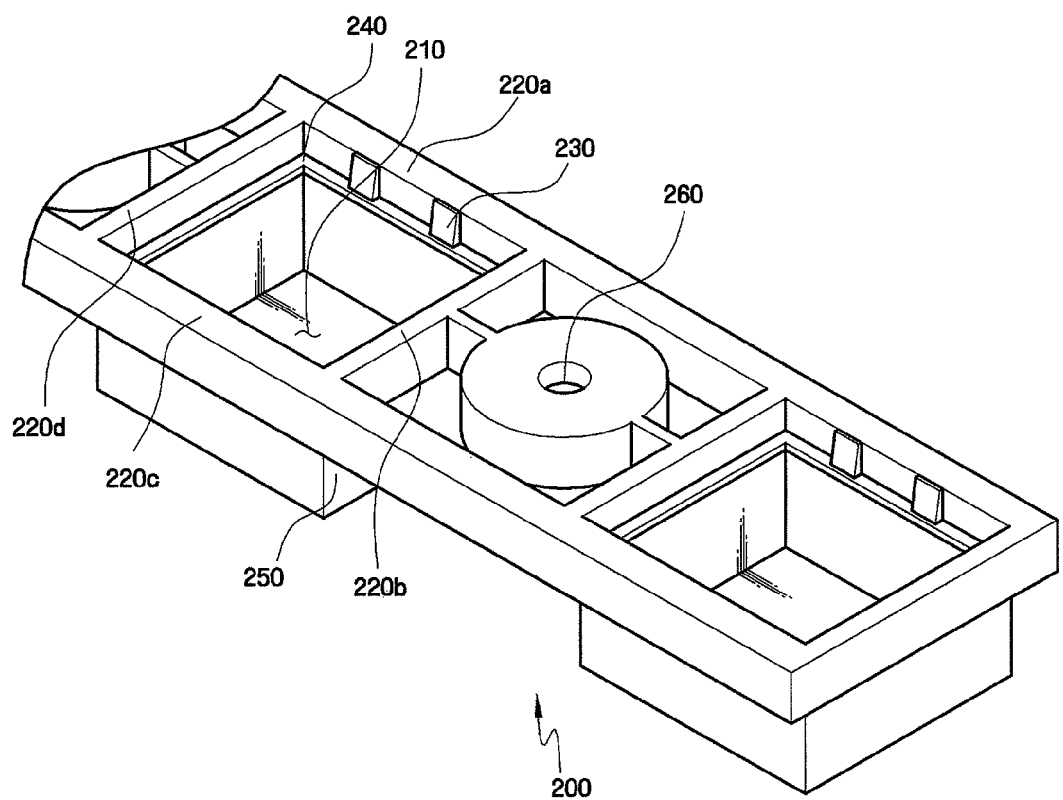
FIG. 2 is a perspective view of a portion of the alignment plate 200 included in the backlight assembly of FIG. 1.
Figure 3:
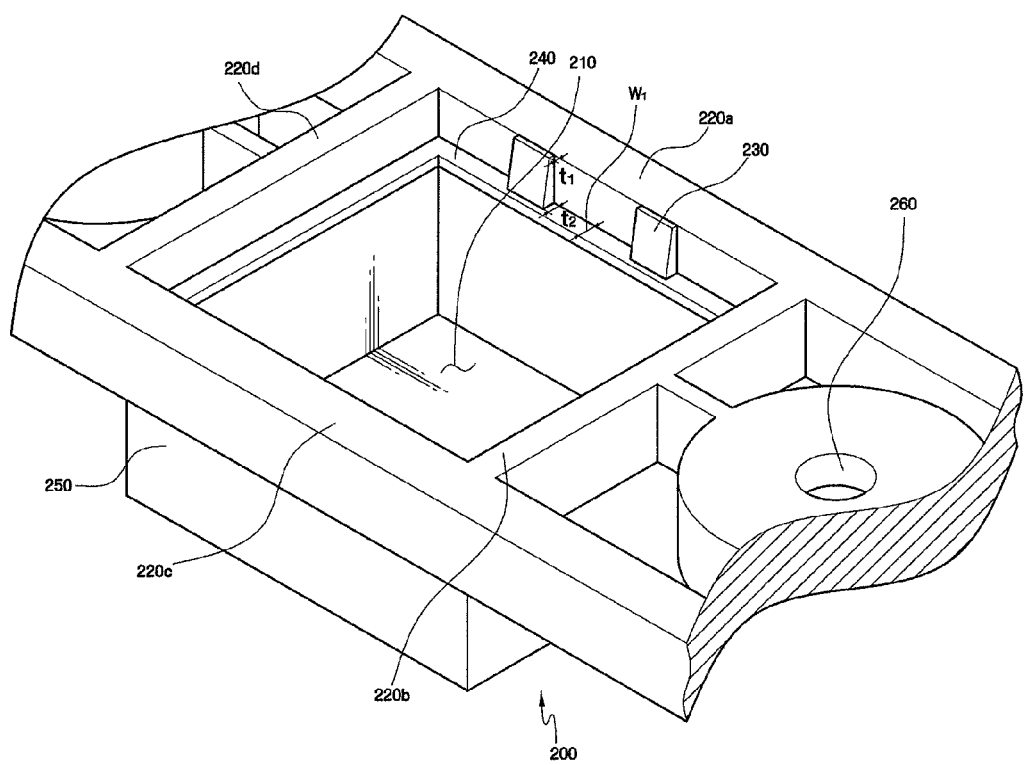
FIG. 3 is an enlarged perspective view of a portion of the alignment plate shown in FIG. 2.

FIG. 2 is a perspective view of a portion of the alignment plate 200 included in the backlight assembly of FIG. 1, and FIG. 3 is an enlarged perspective view of a portion of the alignment plate 200 shown in FIG. 2.

Figure 4:
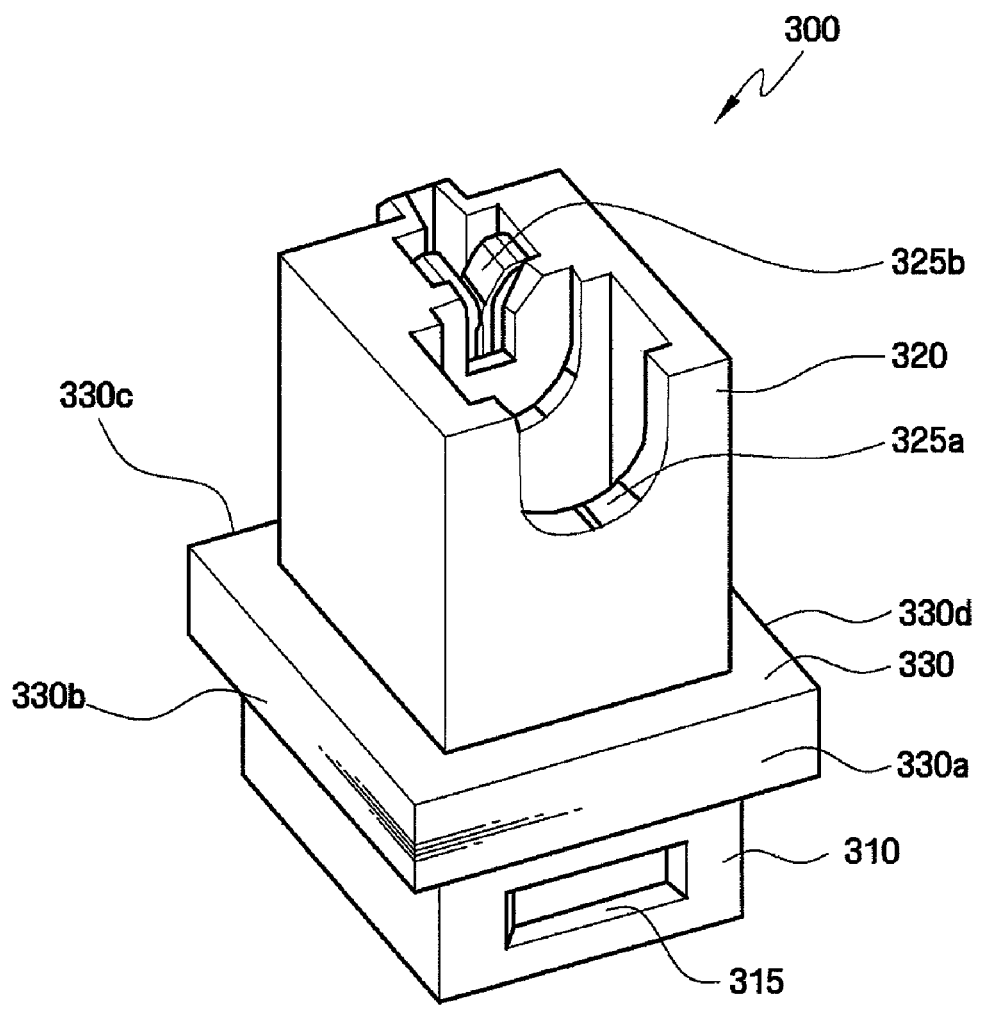
FIG. 4 is a perspective view of a first (power) socket 300 included in the backlight assembly of FIG. 1.

Referring to FIGS. 1 and 2, the alignment plate 200 is disposed at a bottom surface of the first container 150 to securely hold a first (power) socket (300 of FIG. 4).

The alignment plate 200 has a length corresponding to the length of the shorter side of the first container 150, and has a plurality of socket insertion holes 210 and a plurality of fastening portions 260 formed along the length of the alignment plate 200. The socket insertion holes 210 and the fastening portions 260 may be alternately arranged.

A fastener, a screw for example, (not shown) may be inserted into each of the fastening portions 260 to attach the alignment plate 200 to the first container 150. In this case, the socket insertion holes 210 are disposed at locations corresponding to the locations of the openings (holes) 151 in the first container 150.

Referring to FIG. 3, the socket insertion holes 210 are separate from each other, and a socket (300 of FIG. 4), which will be described later, is inserted into each of the socket insertion holes 210 to be securely held.

The socket insertion holes 210 are defined by socket insertion hole sidewalls 220a, 220b, 220c, and 220d. The alignment plate 200 may be formed to have the socket insertion holes 210 surrounded by the socket insertion hole sidewalls 220a, 220b, 220c, and 220d. To facilitate assembling of a socket, each of the socket insertion holes 210 is larger than a second housing (320 of FIG. 4) of the socket.

A seating stage 240 is provided at each of the socket insertion holes 210 to securely hold the socket. The seating stage 240 is used to seat the socket on the alignment plate 200. The seating stage 240 protrudes from the socket insertion hole sidewalls 220a, 220b, 220c, and 220d. In detail, the seating stage 240 is formed along inner surfaces defined by the socket insertion hole sidewalls 220a, 220b, 220c, and 220d, which effectively decreases the size (width and depth, perimeter) of each socket insertion holes 210.

At least one projection 230 is formed on the inner surfaces of the socket insertion hole sidewalls 220a, 220b, 220c, and 220d. The at least one projection 230 may be formed on at least one of the socket insertion hole sidewalls 220a, 220b, 220c, and 220d. In the present embodiment, the at least one projection 230 is formed on the socket insertion hole sidewall 220a that is overlapped by one of the lamps (110 of FIG. 1). Alternatively, two or more projections 230 may be formed on the socket insertion hole sidewall 220a, and may be spaced apart from each other (as shown in FIGS. 2 & 3).

The projection 230 may vary in shape, position and/or size, and may include a rectangular prismatic shape, a semi-circular columnar shape, and a trapezoidal prismatic shape.

The projection 230 protrudes from the inner surface of the socket insertion hole sidewall 220a to come into tight contact with a socket (described later) thereby preventing the socket from moving. The thickness of the projection 230 may gradually increase downwardly from an upper portion to a lower portion of the projection 230. Thus, a thickness $t_1$ of the projection 230 at a top portion of the socket insertion hole sidewall 220a is smaller than a thickness $t_2$ of the projection 230 at a bottom portion of the socket insertion hole sidewall 220a. Use of the projection 230 having a downwardly tapering thickness allows the socket to be secured to the socket insertion holes 210 and to be easily inserted into the socket insertion holes 210. The thickness $t_2$ of the projection 230 may be equal to or smaller than the width $w_1$ of the seating stage 240. If the thickness $t_2$ of the projection 230 is greater than the width $w_1$ of the seating stage 240, it is difficult for the socket to seat on the socket insertion hole 210, unless the projection 230 is designed to plastically deform to a thickness $t_2$ not greater than width $w_1$ upon insertion of the socket.

A protective cover 250 extends from bottom portions of the socket insertion hole sidewalls 220a, 220b, 220c, and 220d and protects the portion of the socket that penetrates the alignment plate 200 and protrudes toward the bottom surface of the first container 150. A power supply connector (not shown) may be provided at the protective cover 250 to connect the socket to an inverter (not shown) attached on the bottom surface of the first container 150.

Hereinafter, a socket according to a first embodiment of the present invention will be described in detail with reference to FIGS. 1 through 4. FIG. 4 is a perspective view of a first (power) socket 300 included in the backlight assembly of FIG. 1.

Referring to FIGS. 1 and 4, a first socket 300 is disposed at one side of the first container 150, and a second (ground) socket 350 is disposed at the opposite side of the first container 150.

The first socket 300 is inserted into the alignment plate 200 attached to the first container 150; specifically, each first socket 300 is inserted into each socket insertion hole 210 provided in the alignment plate 200.

The first socket 300 includes a first housing 310 protruding downward towards the bottom surface of the first container 150, and a second housing 320 extending from the first housing 310 and protruding upward towards the top surface of the first container 150.

The first housing 310 may have an inverter-power-applying hole 315 for applying power from the inverter. The first housing 310 is protected by the protective cover 250 of the alignment plate 200 while the first socket 300 is inserted into a socket insertion hole 210 of the alignment plate 200.

A stepped portion 330 may be provided at the boundary between the first housing 310 and the second housing 320. The stepped portion 330 is supported by the seating stage 240, while the first socket 300 is inserted into a socket insertion hole 210 of the alignment plate 200 so that the socket 300 is seated in the right position on the alignment plate 200.

The second housing 320 includes a lamp guide hole 325a and a lamp connection terminal 325b. The glass tube portion of each of the lamps 110 is seated on the lamp guide hole 325a while the electrode portion of each of the lamps 110 is connected to the lamp connection terminal 325b to be provided with power.

The second (ground) socket 350 is provided at the opposite side of the first container 150. The second (ground) socket 350 similarly supports the other end of each lamp 110 disposed at the other side of the first container 150. In like manner, the ground socket 350 securely holds the lamp 110, but may include only a housing protruding upwardly, unlike the socket 300 which includes a first housing 310 protruding downward towards the bottom surface of the first container 150.

Figure 5:
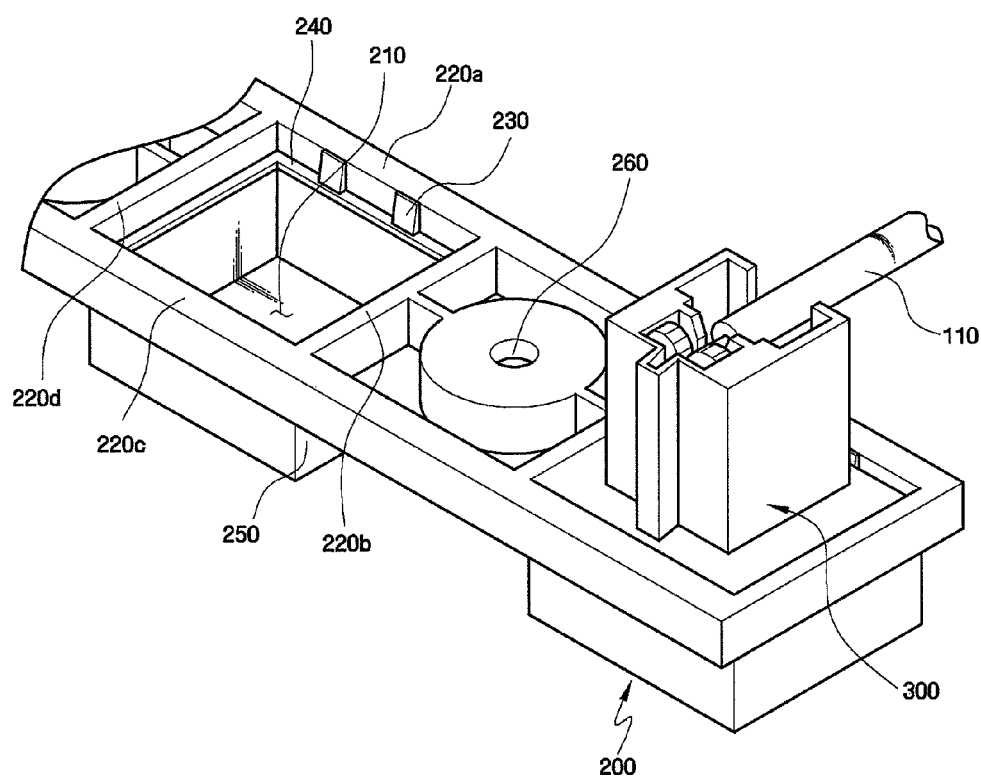
FIG. 5 is a perspective view illustrating the connection of the alignment plate 200 of FIG. 2 and the first (power) socket 300 of FIG. 4.
Figure 6:
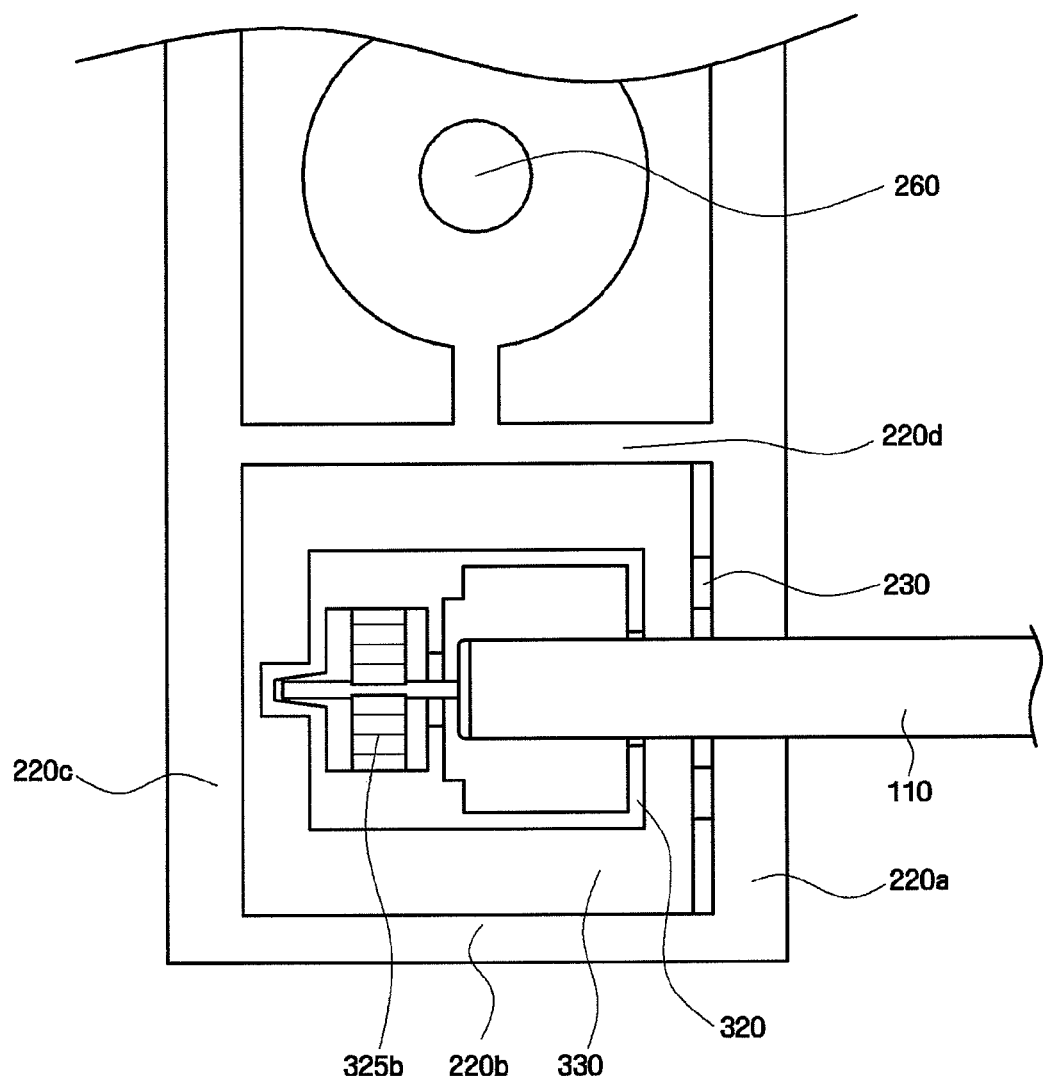
FIG. 6 is a plan view illustrating the connection shown in FIG. 5 of the alignment plate 200 of FIG. 2 and the first (power) socket 300 of FIG. 4.

Hereinafter, the connection of a socket to the alignment plate will be described in detail with reference to FIGS. 5 and 6. FIG. 5 is a perspective view illustrating the connection of the alignment plate 200 of FIG. 2 and the first (power) socket 300 of FIG. 4. FIG. 6 is a plan view illustrating the connection shown in FIG. 5 of the alignment plate 200 of FIG. 2 and the first (power) socket 300 of FIG. 4.

Referring to FIGS. 4 through 6, a first (power) socket 300 is inserted into each of the socket insertion holes 210 of the alignment plate 200 to be securely held therein. In order to facilitate the insertion of the socket 300 into the socket insertion holes 210, a predetermined gap is created between an outer surface of the socket 300 and each of the socket insertion hole sidewalls 220a, 220b, 220c, and 220d. The gap between the outer surface of the socket 300 and each of the socket insertion hole sidewalls 220a and 220c perpendicular to the lamps 110 may be about 1 mm, totaling to 2 mm. However, after the power is turned ON or OFF, a slip phenomenon may occur at the areas of contact between the socket 300 and the alignment plate 200, which are adjacent to each other with a gap interposed therebetween. The slip phenomenon may be caused by a difference in the thermal expansion coefficients of the socket 300 and the alignment plate 200, and/or by a difference in the rate of warming or cooling of the socket 300 and the alignment plate 200.

The projection 230 is formed in the socket insertion holes 210, thereby secures the socket 300 to the alignment plate 200 and prevents the slip phenomenon between the socket 300 and the alignment plate 200. The projection 230 comes into contact with an outer surface of the socket 300, specifically one of the outer surfaces 330a, 330b, 330c, and 330d of the stepped portion 330 of the socket 300. If a projection 230 is provided between each of the socket insertion hole sidewalls 220a, 220b, 220c, and 220d and each of the outer surfaces 330a, 330b, 330c, and 330d of the stepped portion 330 of the socket 300 then the gap between each is effectively eliminated. The projection 230 may be formed to overlap (extend into) the outer surfaces 330a, 330b, 330c, and 330d of the stepped portion 330 of the socket 300 by about 0.05 mm, and the projection 230 and/or the outer surfaces will compress and deform accordingly (as shown in FIG. 6) upon insertion of the projection 230. Accordingly, the socket 300 can be easily inserted into each of the socket insertion holes 210, while the socket 300 becomes secured to each of the socket insertion holes 210 by the stepped portion 330 of the socket 300. Therefore, the socket 300 does not move, and the slip phenomenon between the socket 300 and the alignment plate 200 can be prevented, thereby reducing noise, which would otherwise be generated after power is turned ON or OFF. In order for insertion of the socket 300 not to be impeded by the stepped portion 330 impacting the projection 230 when the socket 300 is inserted into the socket insertion hole 210, the thickness of the stepped portion 330 of the socket 300 may be tapered, having decreasing thickness from a top portion to a bottom portion of the stepped portion 330. In addition, since a difference in the temperature between the socket 300 and the socket insertion hole 210 tends to be greatest across the gap at the socket insertion hole sidewall 220a overlapped by a lamp 110, the projections 230 are preferably formed on the inner surface of the socket insertion hole sidewall 220a overlapped by the lamps 110.

Hereinafter, noise generated by backlight assembly using a socket and an alignment plate according to the present embodiment and noise generated by conventional backlight assembly without the disclosed projections will be compared with reference to FIGS. 7A through 10B. FIGS. 7A, 8A, 9A, and 10A are graphics illustrating measurements of noise generated by a backlight assembly according to an embodiment of the present invention after power was turned ON or OFF. FIGS. 7B, 8B, 9B, and 10B are graphs illustrating measurements of noise generated by a conventional backlight assembly (without the claimed projections) after power was turned ON or OFF.

Figure 7A:
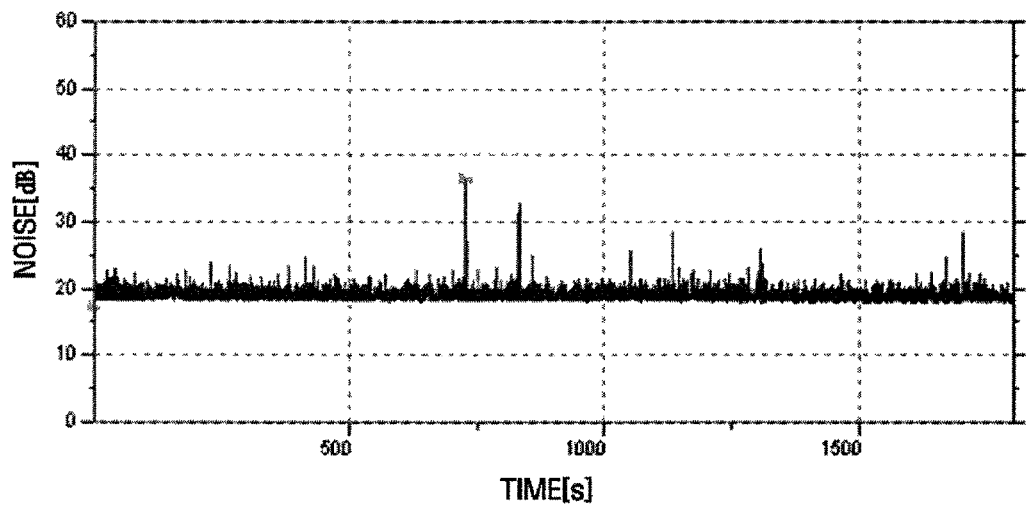
FIGS. 7A, 8A, 9A, and 10A are graphs illustrating measurements of noise generated by a backlight assembly made according to various exemplary embodiments of the present invention after power was turned ON or OFF.
Figure 7B:
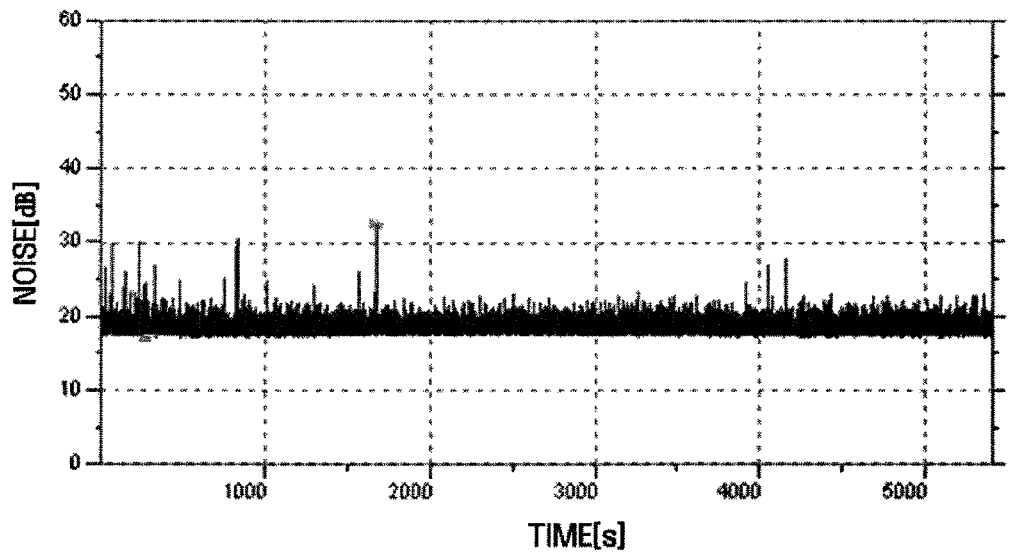
FIGS. 7B, 8B, 9B, and 10B are graphs illustrating measurements of noise generated by a conventional backlight assembly (made without the projections disclosed and claimed herein) after power was turned ON or OFF.

First, FIGS. 7A and 7B illustrate measurements of noise generated by backlight assemblies measured at a viewer's position after power was turned ON. After the power of a backlight assembly including an alignment plate having projections according to the present embodiment (shown in FIGS. 1-6) was turned ON, noise generated by the backlight assembly was measured at the position of a viewer's position over a lapse of a time. Comparing FIG. 7A and FIG. 7B shows that relatively little noise hearable at the viewer's position was generated by the backlight assembly made according to the present embodiment of the present invention. In contrast, as shown in FIG. 7B, noise measured at the viewer's position after the power of a conventional backlight assembly (without the claimed projections) was turned ON, and the measurements indicate that noise exceeding a predetermined intensity was frequently generated after the power was turned ON.

Figure 8A:
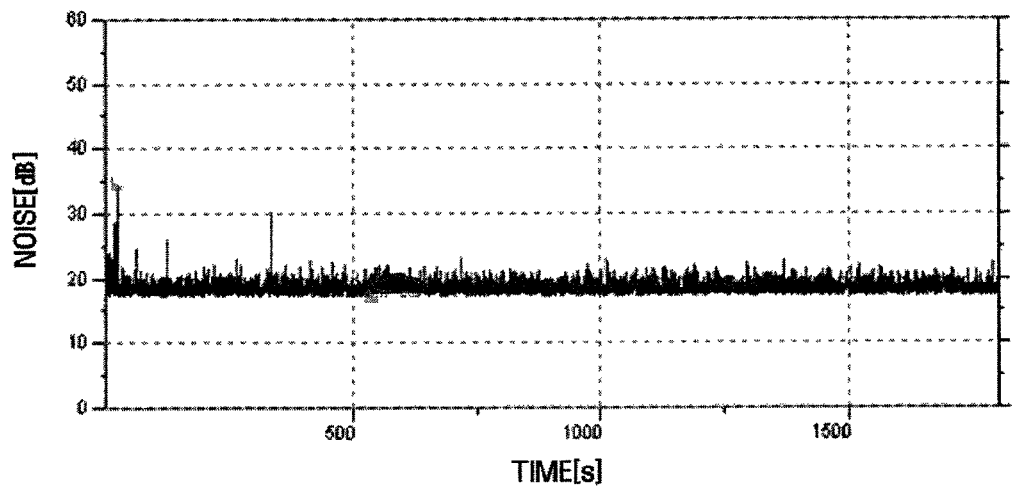
Figure 8B:
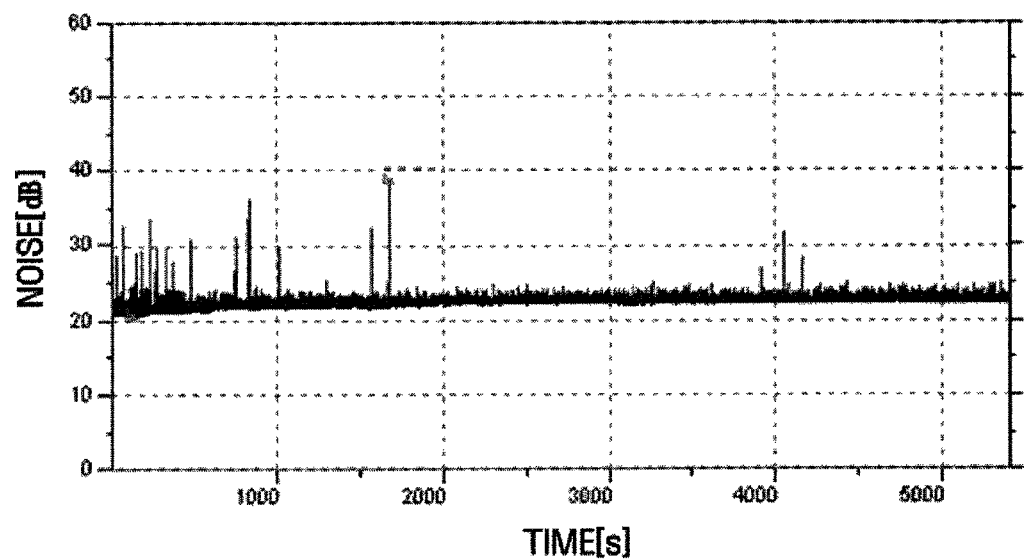

FIGS. 8A and 8B illustrate measurements of the noise generated by backlight assemblies measured at a side opposite to the viewer' position after the power was turned ON. Thus, after the power of the backlight assembly was turned ON, noise generated by the backlight assemblies was measured at the side opposite to the viewer' position over a lapse of a time. As shown in FIG. 8B, after the power of the conventional backlight assembly is turned ON, the measurements indicate that noise exceeding a predetermined intensity was more frequently generated by the conventional backlight assembly at initial stages.

Figure 9A:
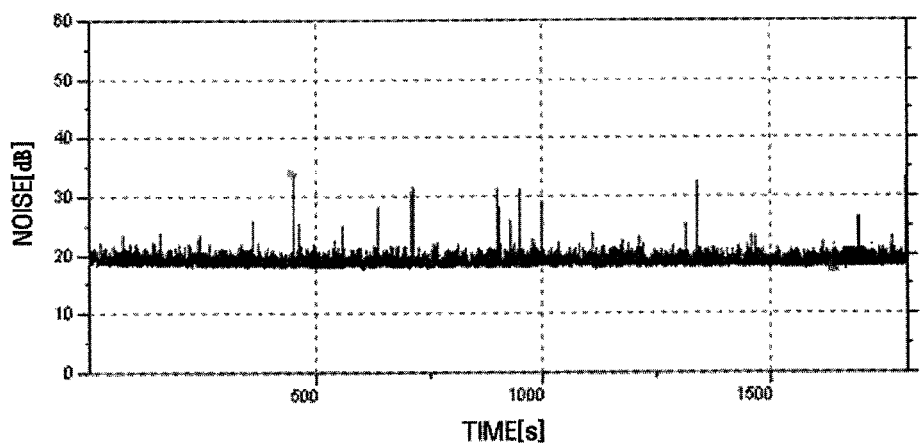
Figure 9B:
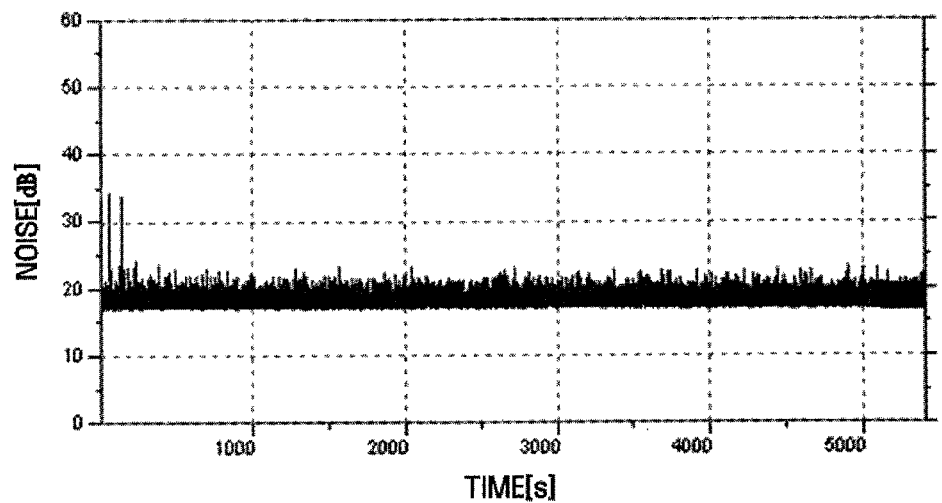

FIGS. 9A and 9B illustrate measurement of noise generated by backlight assemblies measured at the viewer' position after the power was turned OFF. Thus, after the power of a backlight assemblies was turned OFF, noise generated by the backlight assemblies was measured at the viewer's position over a lapse of a time. As shown in FIG. 9B, the measurements indicate that noise exceeding a predetermined intensity was more frequently generated by the conventional backlight assembly at initial stages.

Figure 10A:
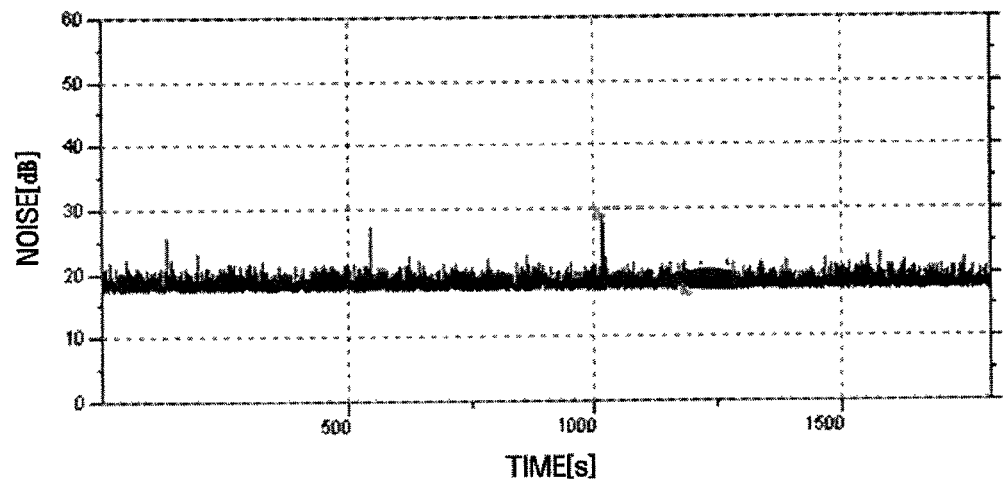
Figure 10B:
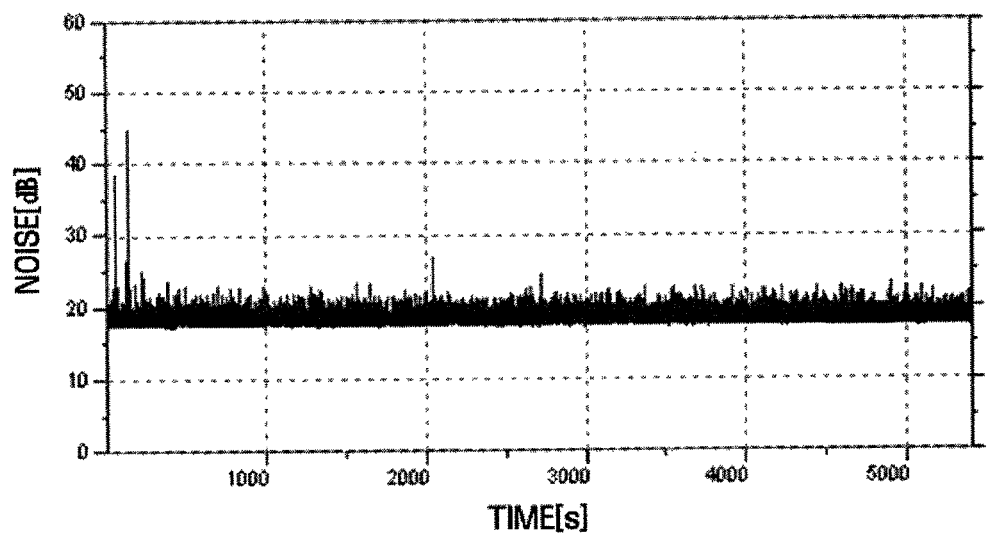

FIGS. 10A and 10B illustrate measurements of noise generated by backlight assemblies measured at the side opposite to the viewer' position after the power was turned OFF. Thus, after the power of the backlight assembly was turned OFF, noise generated by the backlight assemblies was measured at the side opposite to the viewer' position over a lapse of a time. As shown in FIG. 10B, the measurements indicate that noise exceeding a predetermined intensity was more frequently generated by the conventional backlight assembly at initial stages.

Hereinafter, a liquid crystal display (LCD) including a backlight assembly according to a first embodiment of the present invention will be described. The LCD according to the present invention further includes an LCD panel assembly (not shown) and a top chassis (not shown) in addition to the backlight assembly of FIGS. 1-6.

The LCD panel assembly (not shown) includes an LCD panel including a thin film transistor (TFT) substrate (not shown) and a color filter substrate (not shown), liquid crystal layer (not shown), a gate line driver chip (not shown), a data line driver chip (not shown) and a printed circuit board (not shown).

The LCD panel includes the TFT substrate, black matrixes, a common electrode, and a color filter substrate opposite the TFT substrate. The TFT substrate includes gate lines (not shown), data lines (not shown), a TFT array, and pixel electrodes.

The gate line driver chip is connected to the respective gate lines formed on the TFT substrate, and the data line driver chip is connected to the respective data lines formed on the TFT substrate.

A variety of driving components for driving gate driving signals applied to the gate tape carrier package and data driving signals applied to the data tape carrier package are mounted on the printed circuit board.

A top chassis (not shown) is connected to the bottom chassis (second container 160) so as to cover an upper surface of the LCD panel assembly received in the bottom chassis (second container 160). A window for exposing the LCD panel assembly to the viewer is disposed in the upper surface of the top chassis.

The slip between the socket 300 and the alignment plate 200 and resulting noise generated after the power is turned ON or OFF, can be prevented by forming projections on the alignment plate, like in the first exemplary embodiment, as described above, thereby suppressing noise generated at a gap between components.

Figure 11:
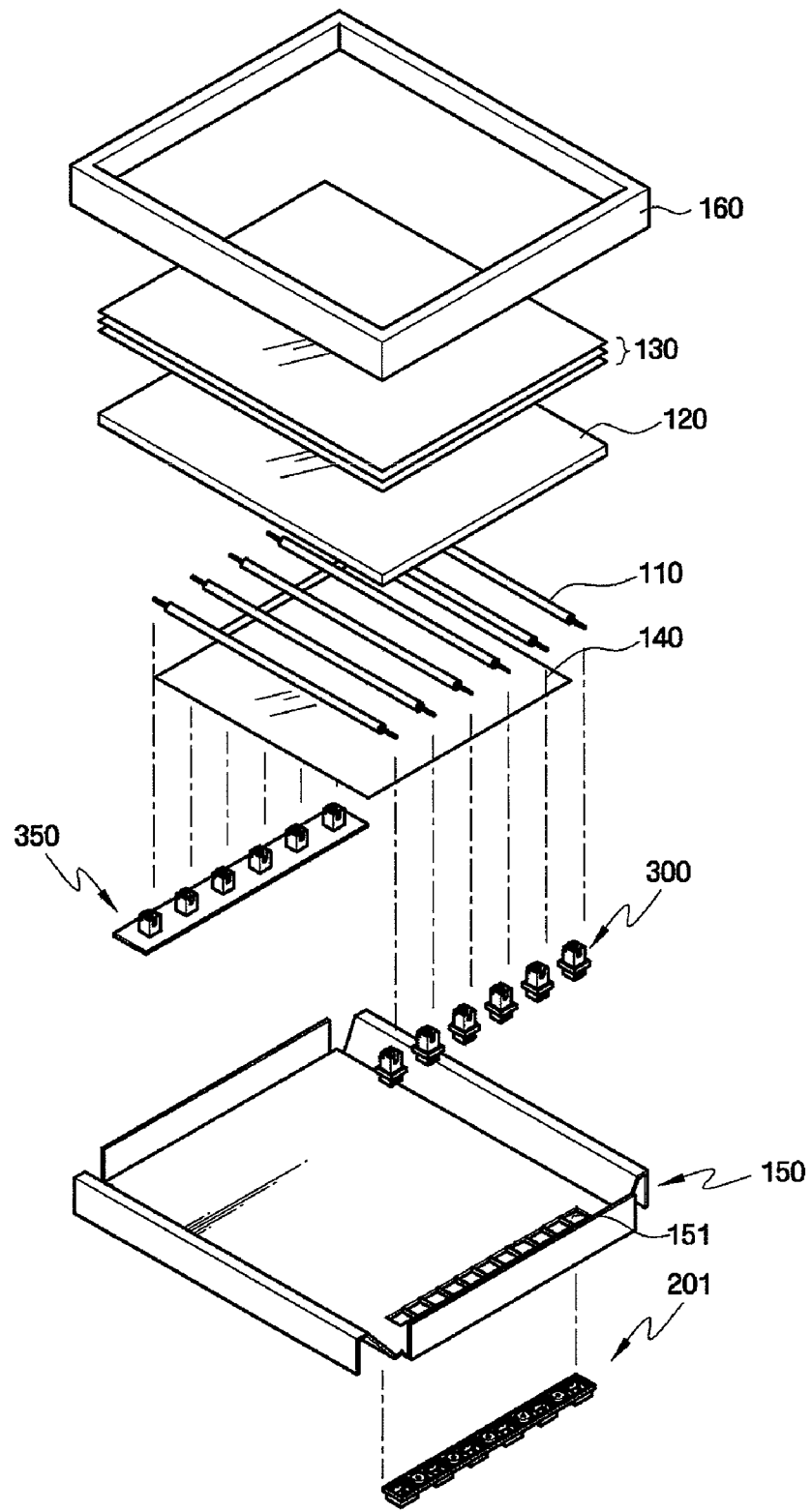
FIG. 11 is an exploded perspective view of a backlight assembly according to a second exemplary embodiment of the present invention.
Figure 12:
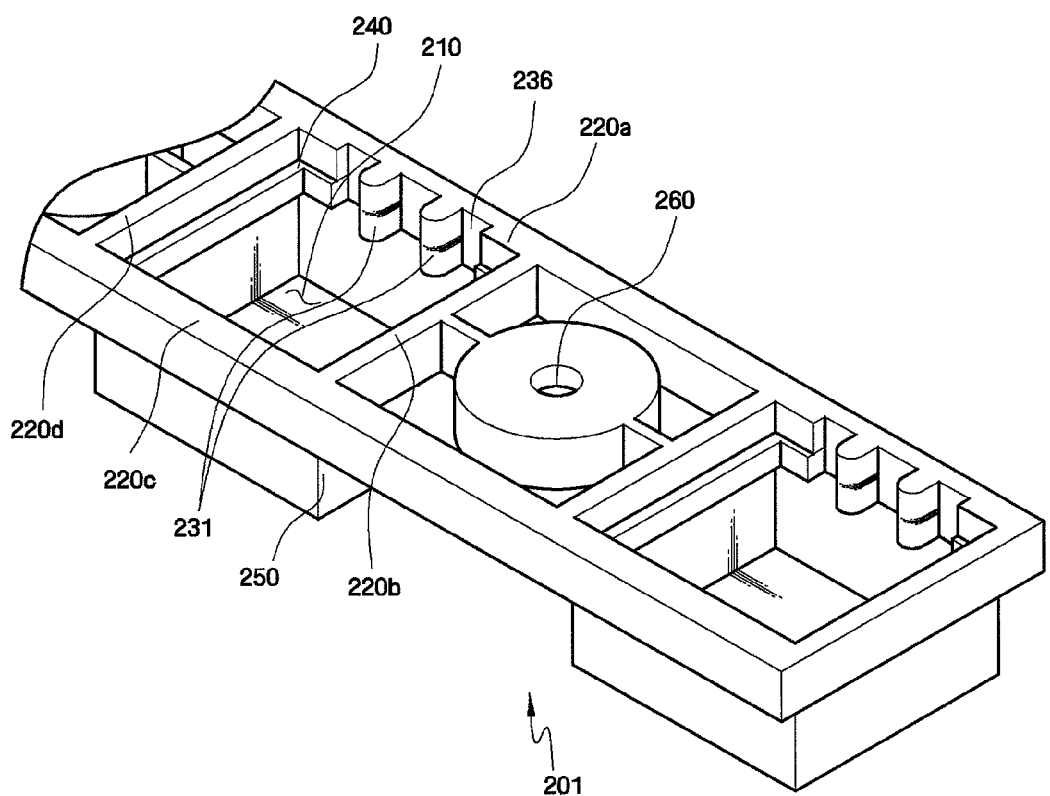
FIG. 12 is a perspective view of the alignment plate 201 included in the backlight assembly of FIG. 11.
Figure 13:
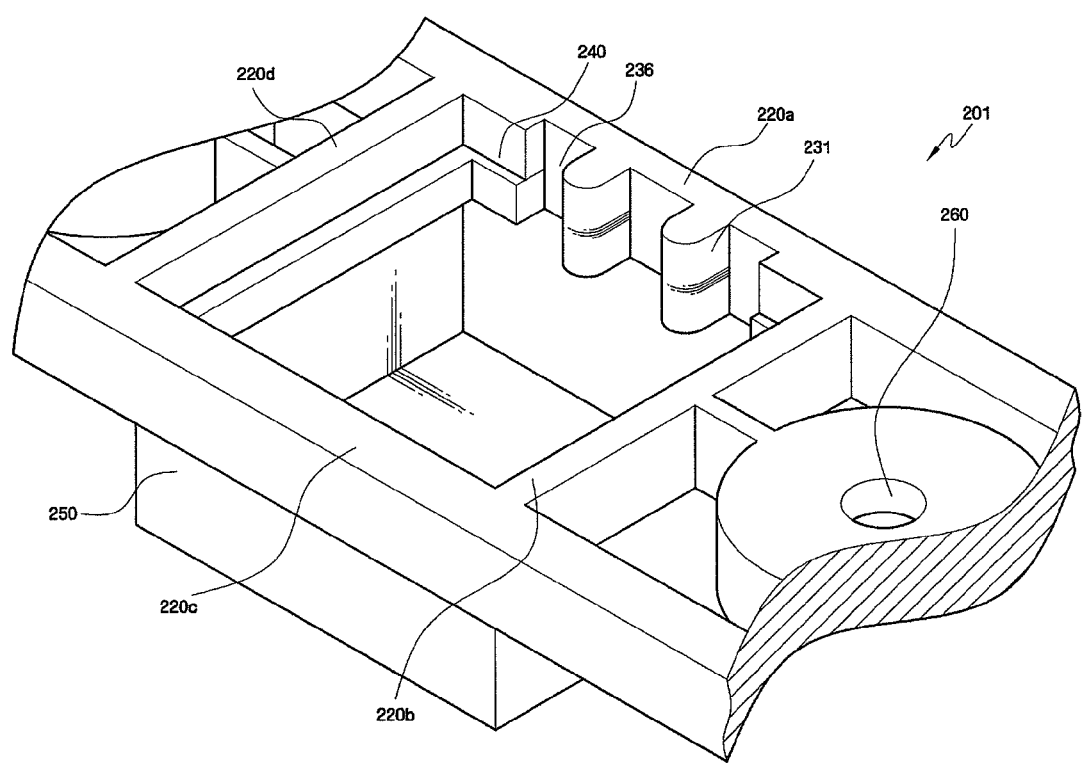
FIG. 13 is an enlarged view of a portion of the alignment plate 201 shown in FIG. 12.
Figure 14:
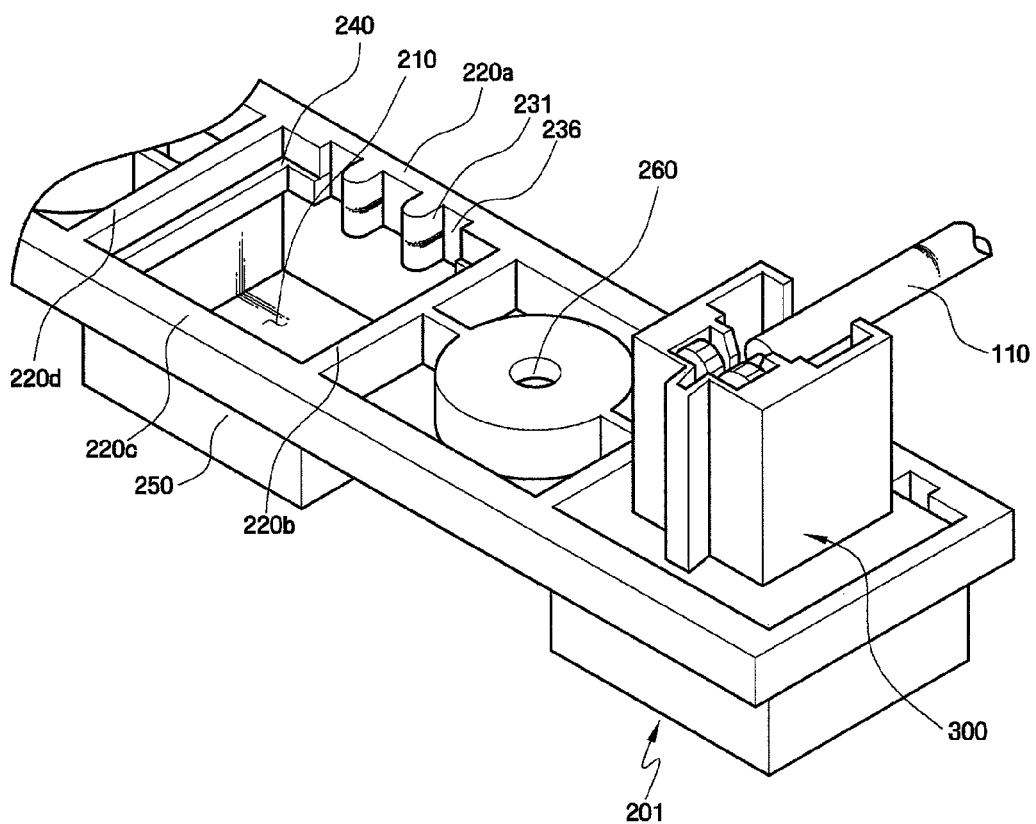
FIG. 14 is a view schematically illustrating the connection of the alignment plate 201 of FIG. 12 with the socket 300 of FIG. 4.

Hereinafter, a backlight assembly according to a second exemplary embodiment of the present invention will be described in detail with reference to FIGS. 11 through 15. FIG. 11 is an exploded perspective view illustrating a backlight assembly according to a second exemplary embodiment of the present invention. FIG. 12 is a perspective view of the alignment plate 201 included in the backlight assembly of FIG. 11. FIG. 13 is an enlarged perspective view of a portion of the alignment plate 201 shown in FIG. 12. FIG. 14 is a perspective view illustrating the secure connection of the alignment plate 201 of FIG. 12 with a socket 300 of FIG. 4.

Figure 15:
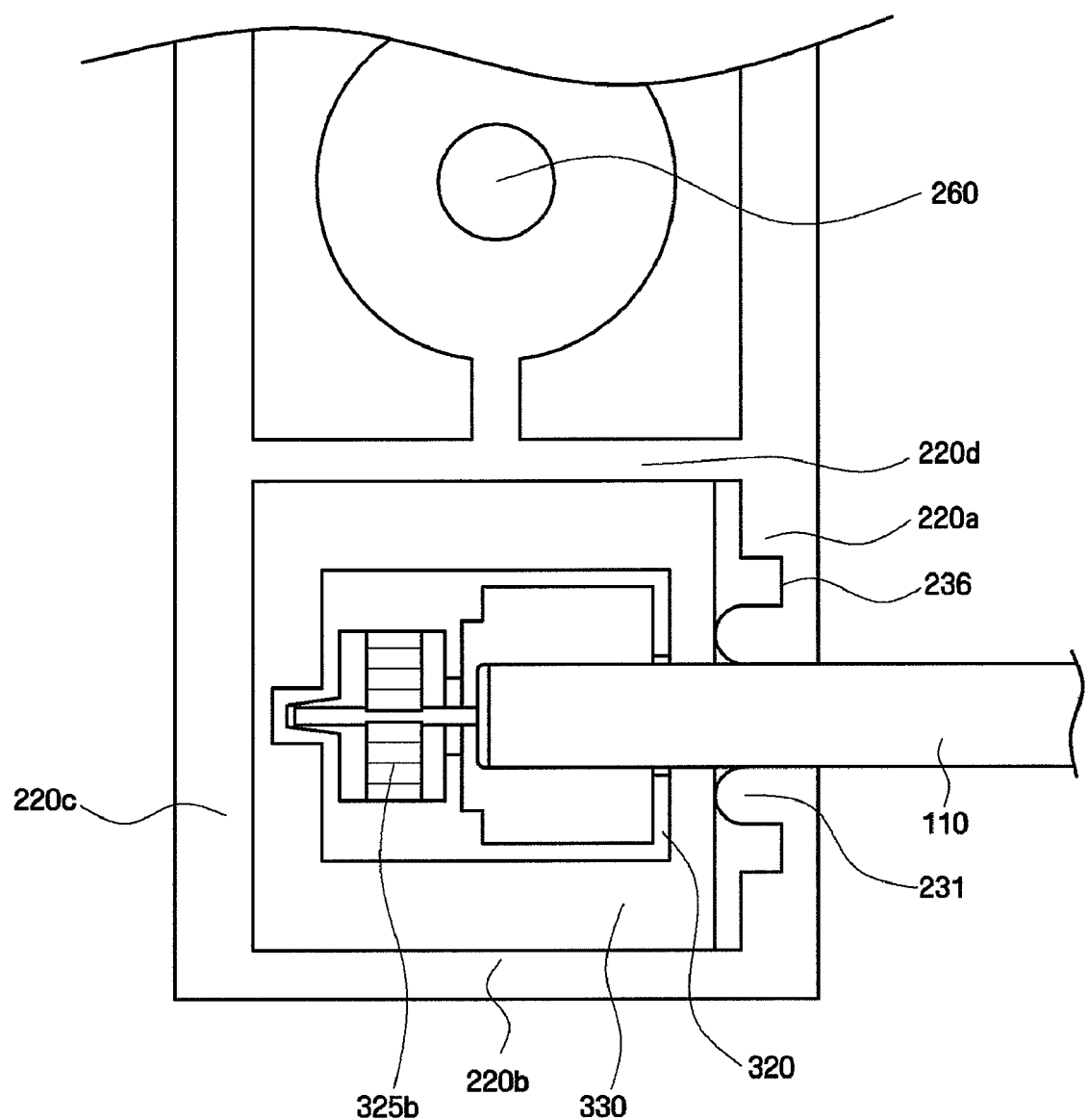
FIG. 15 is a plan view of the connection of the alignment plate 201 of FIG. 12 and the socket 300 of FIG. 4.

FIG. 15 is a plan view of the connection of the alignment plate 201 of FIG. 12 and the socket of FIG. 4. For explanatory convenience, components having the same function as in the above description of the first exemplary embodiment are respectively identified by the same reference numerals, and a redundant description thereof will be omitted. The backlight assembly according to the second exemplary embodiment of the present invention is substantially the same with the backlight assembly according to the first embodiment of the present invention, except that it further includes recesses formed on its alignment plate 201.

Referring to FIG. 11, the backlight assembly according to the second exemplary embodiment of the present invention is substantially the same as the backlight assembly according to the first embodiment, except that projections 231 and recesses 236 are provided at the alignment plate 201 included in the backlight assembly according to the present embodiment.

Referring to FIGS. 12 and 13, the alignment plate 201 according to the present embodiment also has a plurality of socket insertion holes 210 and a plurality of fastening portions 260 formed along the length of the alignment plate 200. The socket insertion holes 210 are defined by the socket insertion hole sidewalls 220a, 220b, 220c, and 220d.

At least one projection 231 is formed on the inner surface of at least one of the socket insertion hole sidewalls 220a, 220b, 220c, and 220d. The at least one projection 231 may be formed on the socket insertion hole sidewall 220a overlapped by a lamp 110. Recesses 236 formed in the inner surface of the socket insertion hole sidewall 220a of the alignment plate 201 prevent interference with the insertion of the socket (300 of FIG. 14) into the alignment plate 201 during assembly due to the projection 231. According to the present embodiment, the projection 231 is columnar shaped (not tapered) including a hemi-circular cross section, but the invention is not limited thereto. Alternatively, as in the previous embodiment, the thickness of the projection 231 may gradually increase downwardly (a tapered thickness). The recesses 236 may be formed in the socket insertion hole sidewall 220a having the projection 231 formed thereon. Two recesses 236 may be formed on either side of a projection 231 in the socket insertion hole sidewall 220a. If more than one projection 231 is formed on the socket insertion hole sidewall 220a the recesses 236 may be formed between the projections 231 (as shown in FIGS. 12, 13 and 14). Thus, the projections 231 and the recesses 236 may be formed to alternate on the socket insertion hole sidewall 220a (as shown in FIGS. 12, 13 and 14). The recesses 236 may have various shapes, including a rectangular channel, a semi-circular channel, or the like, but not limited thereto as long as the recesses 236 facilitate assembly (insertion) of the socket into the socket insertion holes 210.

Figure 16:
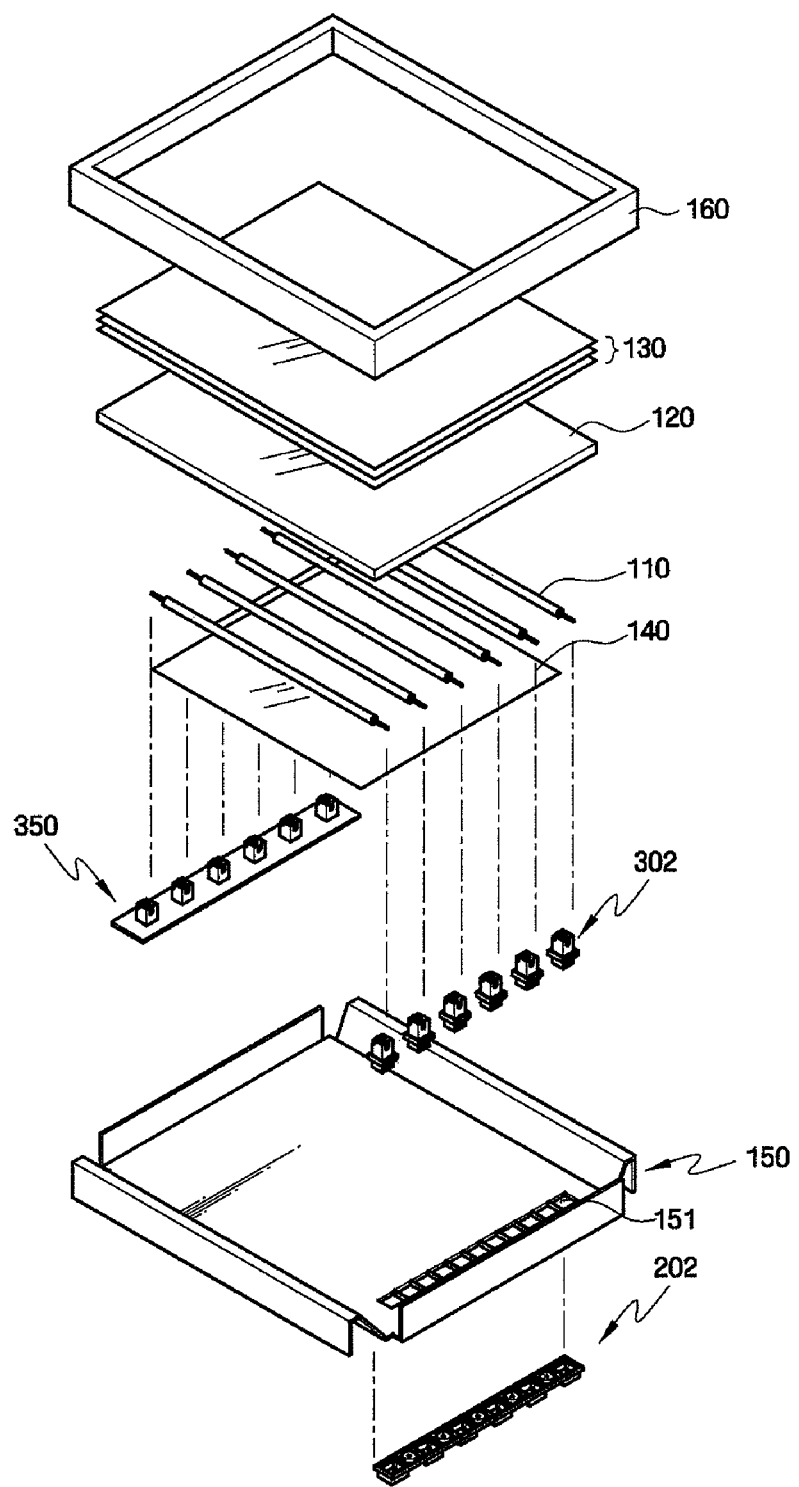
FIG. 16 is an exploded perspective view of a backlight assembly according to a third exemplary embodiment of the present invention.
Figure 17:
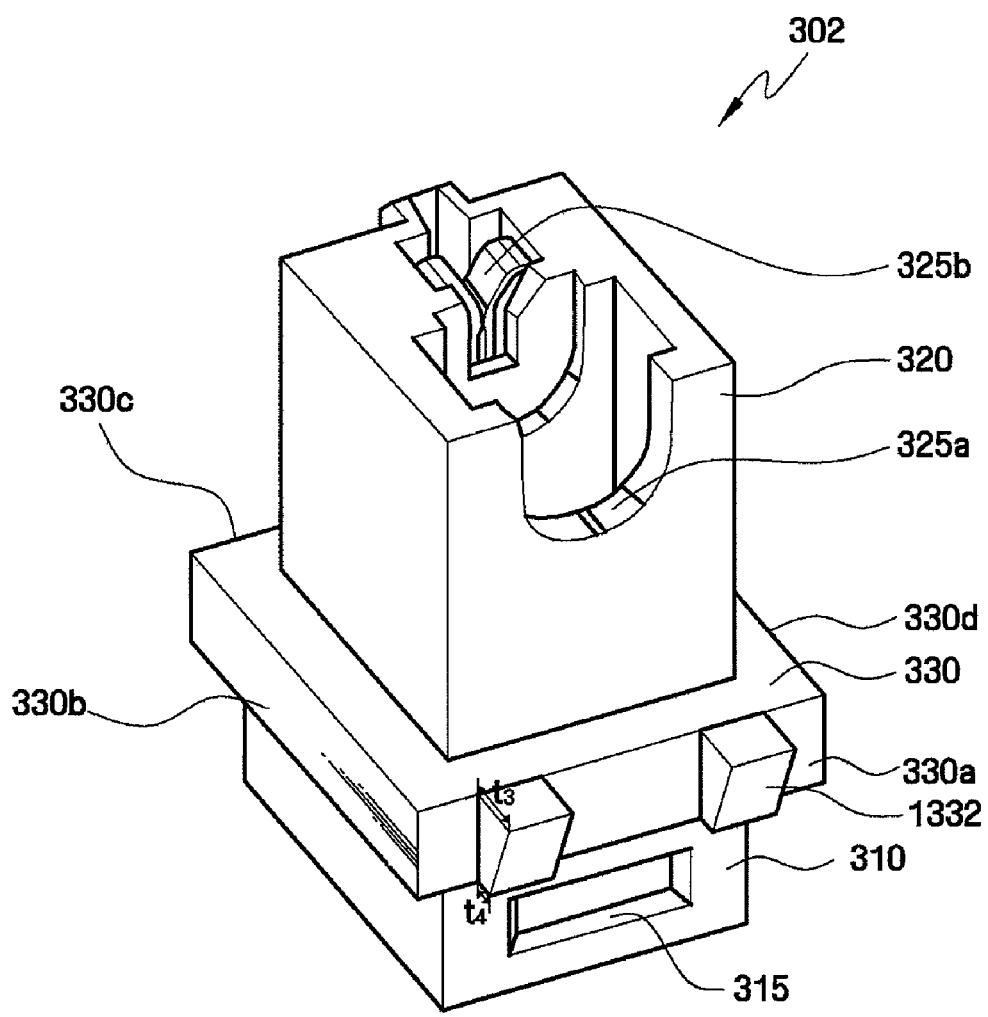
FIG. 17 is a perspective view of the socket 302 included in the backlight assembly of FIG. 16.
Figure 18:
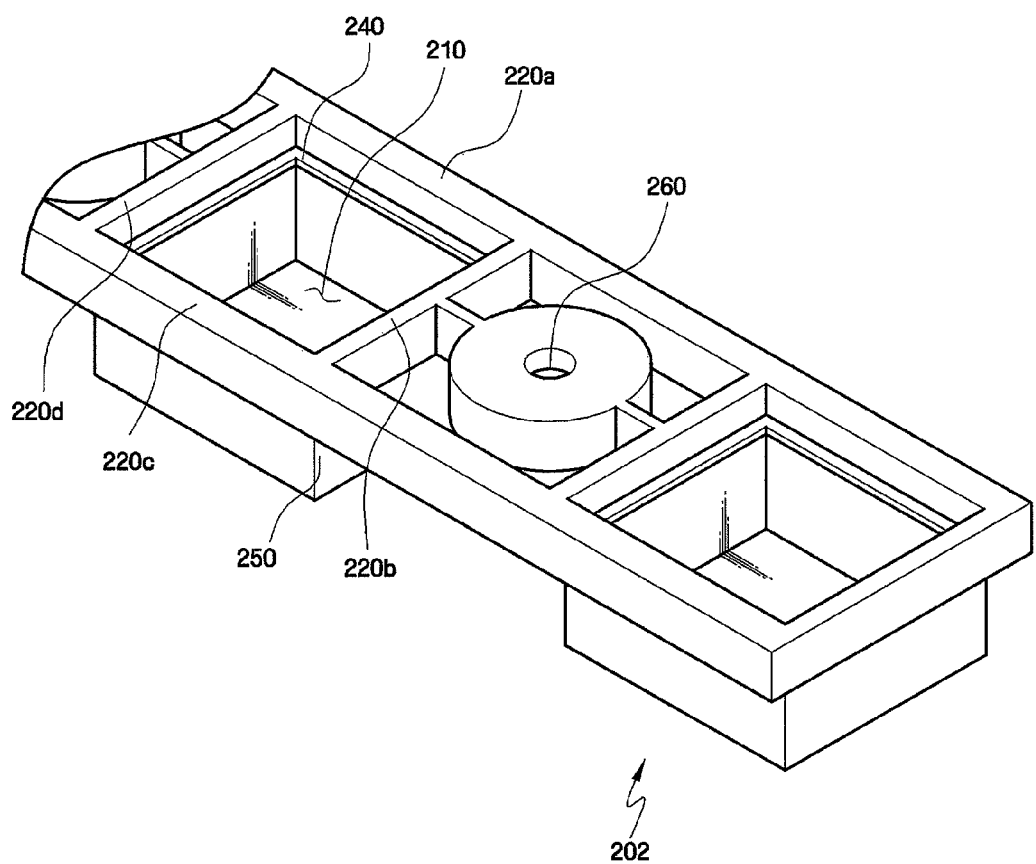
FIG. 18 is a perspective view of the alignment plate 202 included in the backlight assembly of FIG. 16.
Figure 19:
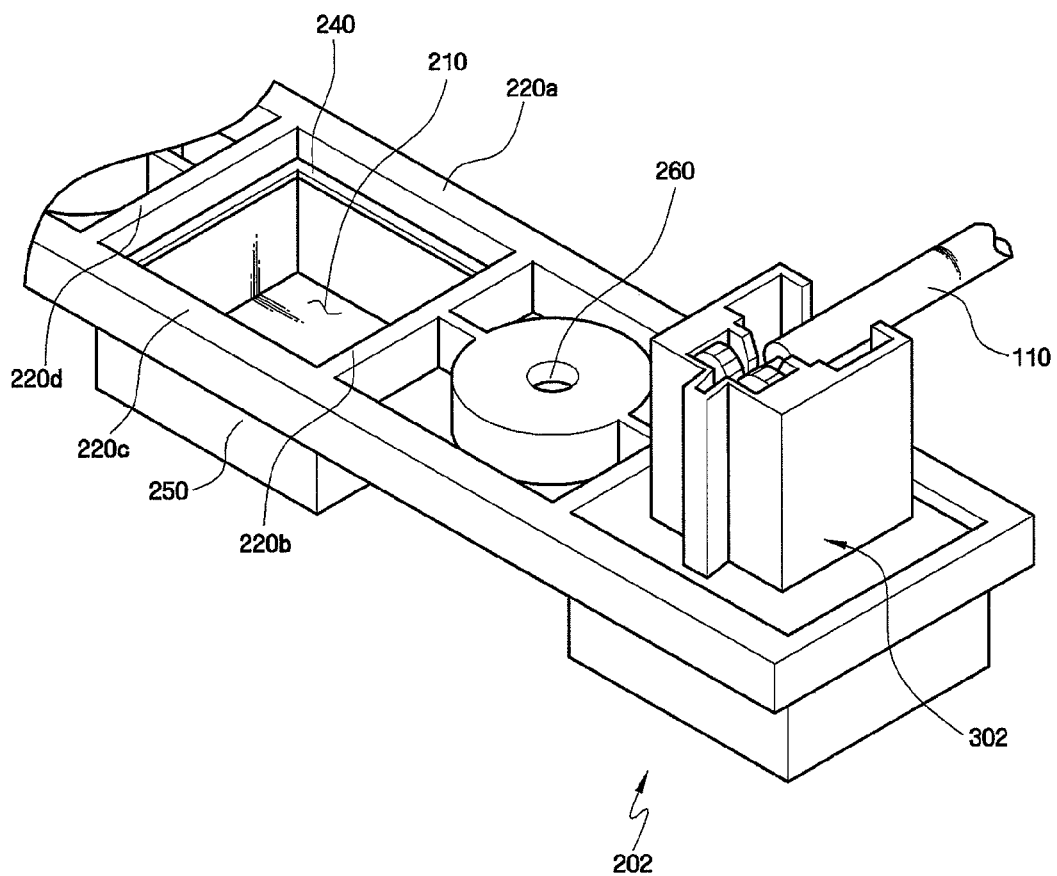
FIG. 19 is a perspective view illustrating the connection of the alignment plate 202 with the socket 302 of FIG. 17.

Hereinafter, a backlight assembly according to a third exemplary embodiment of the present invention will be described in detail with reference to FIGS. 16 through 19. FIG. 16 is an exploded perspective view of a backlight assembly according to a third exemplary embodiment of the present invention. FIG. 17 is a perspective view of a socket 302 included in the backlight assembly of FIG. 16. FIG. 18 is a perspective view of an alignment plate 202 included in the backlight assembly of FIG. 16. FIG. 19 is a perspective view illustrating the connection of the alignment plate 202 with the socket 302 of FIG. 17.

The backlight assembly according to the present embodiment is the same as that according to the first embodiment except that projections are formed on the socket and not on the wall of a socket insertion hole of an alignment plate.

Referring to FIG. 17, at least one projection 1332 is formed on an outer surface of the socket 302. The at least one projection 1332 prevents the socket 302 and the alignment plate 202 from moving relative to each other due to temperature differences after power is turned ON or OFF. The socket 302 includes a first housing 310 extending towards a bottom surface of a first container 150, a second housing 320 extending upward from the first housing 310 and protruding towards a top surface of the first container 150, and a stepped portion 330 at the boundary between the first housing 310 and the second housing 320. Upon insertion of the socket, the stepped portion 330 is supported upon the seating stage 240 of the alignment plate to allow the socket 302 to be seated on the alignment plate 202. The at least one projection 1332 may be formed on outer surfaces 330a, 330b, 330c, and 330d of the stepped portion 330.

Two or more projections 1332 may be formed on each one of the outer surfaces 330a, 330b, 330c, and 330d of the stepped portion 330. The two or more projections 1332 formed on one of the outer surfaces 330a, 330b, 330c, and 330d of the stepped portion 330 may be spaced apart from each other. Among the outer surfaces 330a, 330b, 330c, and 330d of the stepped portion 330, the projection 1332 is preferably formed on the outer surface 330 overlapped by the lamp (110 of FIG. 1).

The thickness of the projection 1332 may gradually decrease downwardly from a top portion to a bottom portion (a taper). Thus, the thickness $t_3$ of a top portion of the projection 1332 is greater than the thickness $t_4$ of a bottom portion of the projection 1332. Use of socket 302 having the projection 1332 having a tapered thickness allows the socket to be easily inserted into the socket insertion holes 302 and to be firmly secured to (wedged into) the socket insertion holes (302 of FIG. 18).

Referring to FIGS. 17 through 19, the thickness $t_3$ of the projection 1332 may be equal to or smaller than the width $w_1$ of the seating stage 240 (see FIG. 3). If the thickness $t_3$ of the projection 1332 is greater than the width $w_1$ of the seating stage 240, it may be more difficult for the socket 302 to seat on the socket insertion hole 210. After assembly, a predetermined gap may exist between each of the outer surfaces 330a, 330b, 330c, and 330d of the stepped portion 330 of the socket 302 and each of the socket insertion hole sidewalls 220a, 220b, 220c, and 220d. In this case, the projection 1332 comes into contact with the inner surface of the socket insertion hole sidewall 220a to secure the socket 302 to the socket insertion hole 210 and to prevent the socket from moving relative to the socket insertion hole 210.

Hereinafter, a backlight assembly according to a fourth exemplary embodiment of the present invention will be described in detail with reference to FIGS. 20 through 22.

Figure 20:
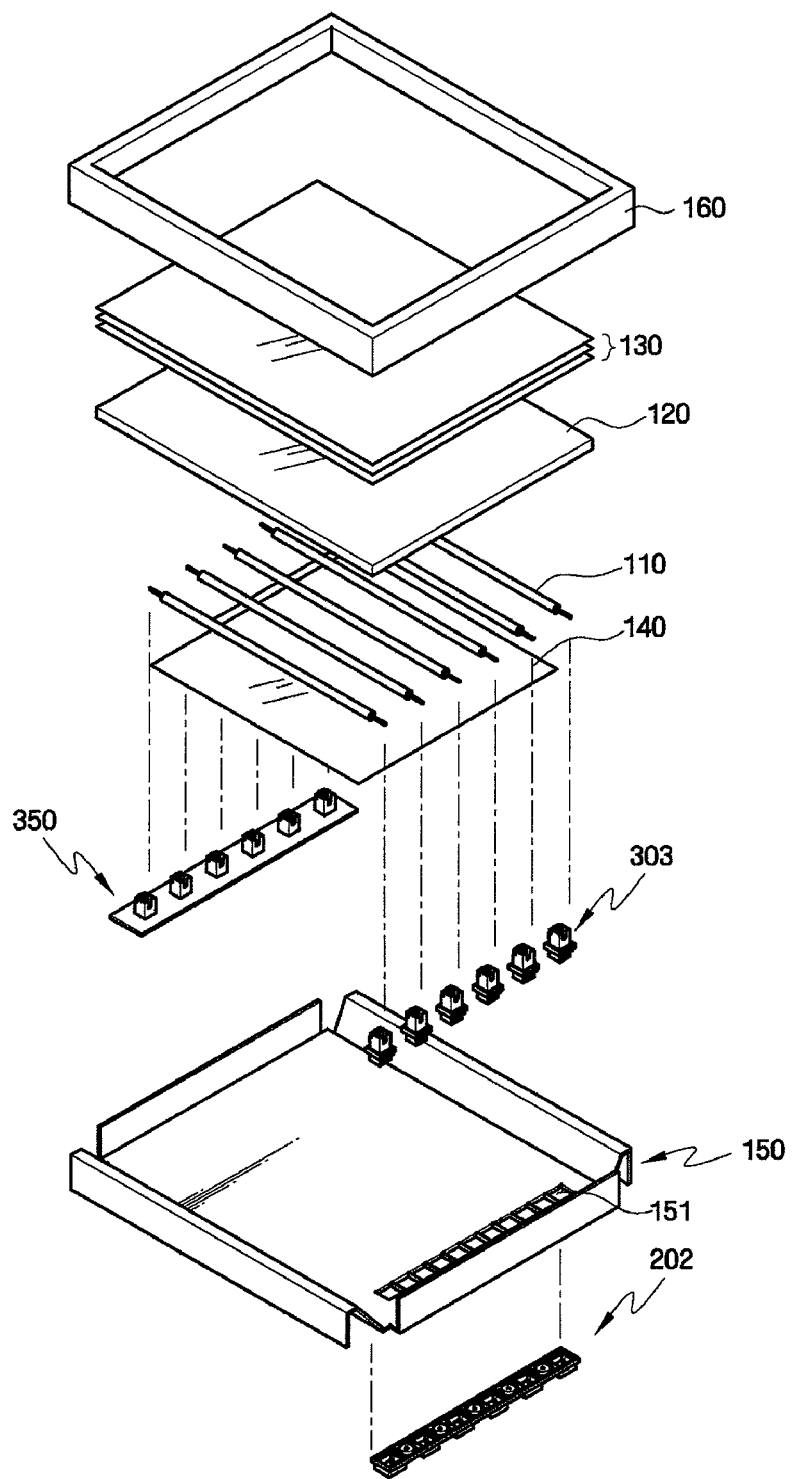
FIG. 20 is an exploded perspective view illustrating a backlight assembly according to a fourth exemplary embodiment of the present invention.

FIG. 20 is an exploded perspective view of a backlight assembly according to a fourth exemplary embodiment of the present invention. FIG. 21 is a perspective view of the socket 303 included in the backlight assembly of FIG. 20. FIG. 22 is a perspective view illustrating the connection of the alignment plate 202 with the socket 303 of FIG. 21. The backlight assembly according to the present embodiment is the same as the backlight assembly according to the third embodiment except that it additionally has a recess in the socket.

Figure 21:
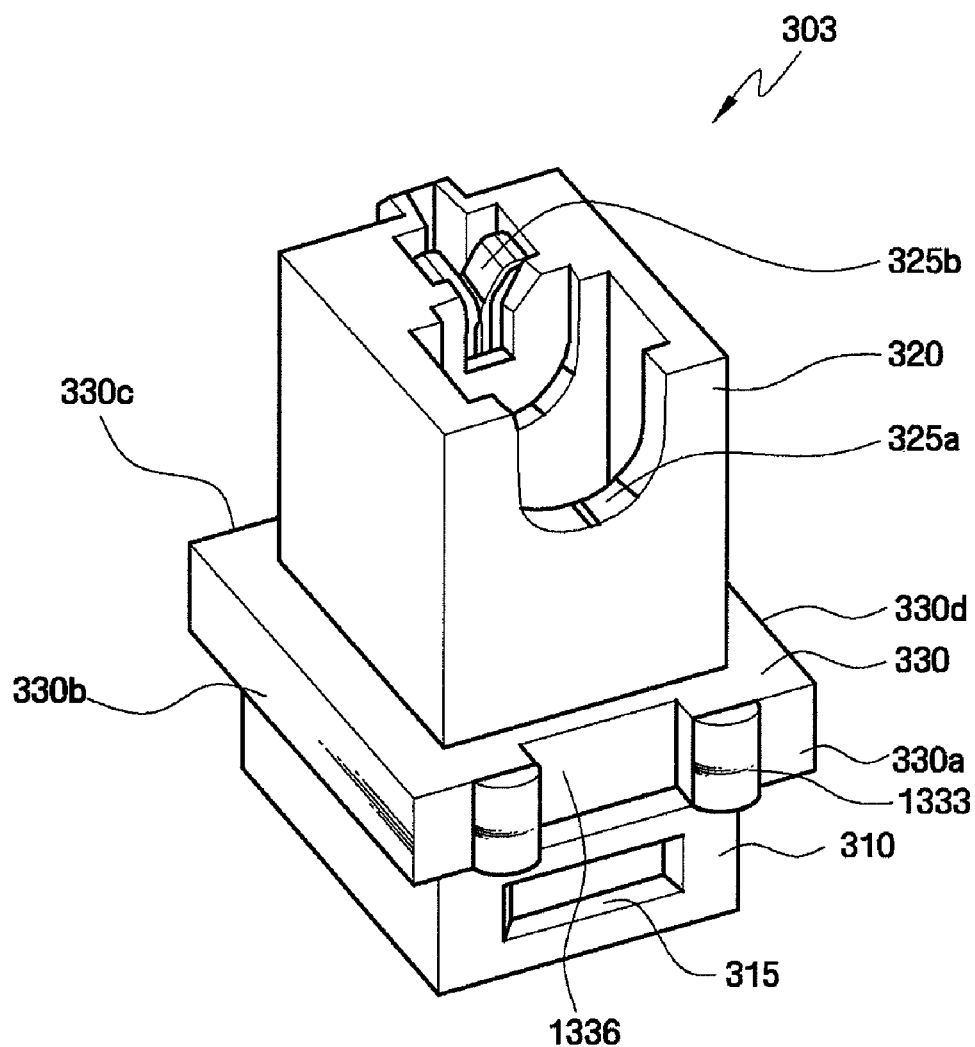
FIG. 21 is a perspective view of a socket 303 included in the backlight assembly of FIG. 20.

Referring to FIG. 21, one or more projections 1333 are formed on an outer surface of the socket 303. In order to facilitate the insertion of the socket 303 into the alignment plate 202, recesses 1336 are provided on outer surfaces of the socket 303. Here, the outer surfaces of the socket 303 may be outer surfaces 330a, 330b, 330c, and 330d of the stepped portion 330, which are disposed at the boundary between the first housing 310 and the second housing 320. The recesses 1336 may be formed between two projections 1333, and the projections 1333 and the recesses 1336 may be alternately formed on an outer surface of the socket 303.

Figure 22:
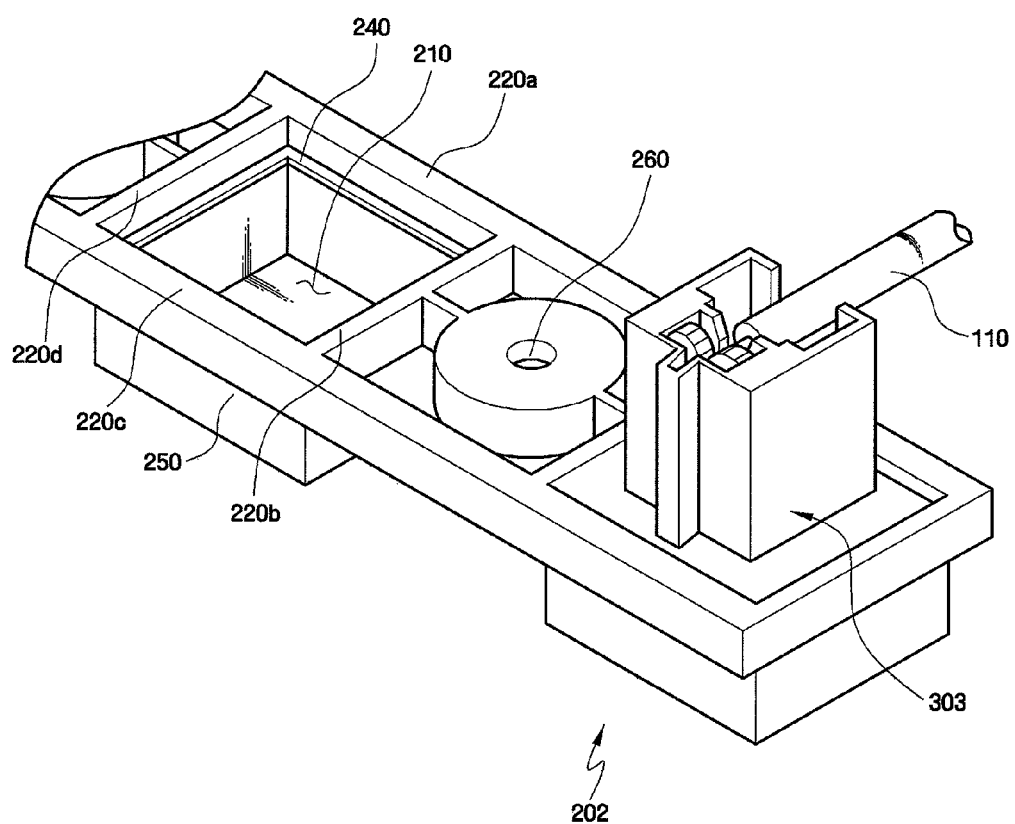
FIG. 22 is a perspective view illustrating the connection of the alignment plate 202 with the socket 303 FIG. 21.

Referring to FIGS. 21 and 22, upon insertion of the socket, the projections 1333 on the socket contact the socket insertion hole sidewall (220a), and a gap exist between the recess 1336 and the same socket insertion hole sidewall (220a). The recess 1336 imparts elasticity to the stepped portion 330 of the socket 303, thereby facilitating assembling (inserting) of the socket 303 with the alignment plate 202.

According to the backlight assembly of the present exemplary embodiment of the invention and the LCD including the backlight assembly, a gap existing between a socket and an alignment plate is modified by contacts between a socket and the alignment plate, thereby minimizing noise generated at the backlight assembly after power is turned ON or OFF.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments illustrated herein should be considered in all respects as illustrative and not restrictive, reference being made to the appended claims rather than the foregoing description to indicate the scope of the invention.

What is claimed is:

1. A backlight assembly comprising:
an alignment plate having a socket insertion hole having a socket insertion hole sidewall; and
a socket inserted in the socket insertion hole, wherein the socket includes a first housing, a second housing and a stepped portion disposed between the first housing and the second housing; and
a lamp attached to the socket,
wherein at least one projection is formed on the inner surface of the socket insertion hole sidewall and wherein the stepped portion of the socket contacts the projection,
wherein the thickness of the projection gradually increases downwardly and the thickness of the top portion of the projection is thinner than the thickness of the bottom portion of the projection.

2. The backlight assembly of claim 1, wherein the alignment further includes a seating stage formed along the inner surfaces of the socket insertion hole sidewalls.

3. The backlight assembly of claim 2, wherein the maximum thickness of the at least one projection is smaller than the width of the seating stage.

4. The backlight assembly of claim 1, wherein the at least one projection is formed on the one socket insertion hole sidewall.

5. The backlight assembly of claim 1, wherein the outer surfaces of the socket are dimensioned to be spaced a gap apart from the socket insertion hole sidewalls.

6. The backlight assembly of claim 5, wherein the socket is prevented from moving relative to the socket insertion hole sidewall by contacting the at least one projection formed on the socket insertion hole sidewall.

7. The backlight assembly of claim 1, further comprising a recess formed on the inner surface of the socket insertion hole sidewall adjacent to the at least one projection.

8. The backlight assembly of claim 7, wherein the thickness from the recess to the outer surface of the socket insertion hole sidewall is ½ to ⅔ of the nominal thickness of the socket insertion hole sidewall.

9. A backlight assembly comprising:
an alignment plate having a socket insertion hole having socket insertion hole sidewalls;
a socket inserted in the socket insertion hole, wherein the socket includes a first housing, a second housing and a stepped portion disposed between the first housing and the second housing;
a lamp attached to the socket; and
a bottom chassis to which the alignment plate is attached;
wherein at least one projection is formed on the stepped portion of the socket,
wherein an inner surface of the socket insertion hole sidewalls contacts the at least one projection, and
wherein the thickness of the at least one projection is tapered, the thickness of the projection gradually decreases downwardly from a top portion to a bottom portion, and the thickness of the top portion of the projection is thicker than the thickness of the bottom portion of the projection.

10. The backlight assembly of claim 9, wherein the outer surfaces of the socket are dimensioned to be spaced a gap apart from the socket insertion hole sidewalls.

11. The backlight assembly of claim 10, wherein the socket is prevented by the at least one projection from moving relative to the socket insertion hole sidewalls.

12. The backlight assembly of claim 9, further comprising a recess formed in the outer surface of the socket adjacent to the at least one projection.

13. A liquid crystal display (LCD) comprising:
an alignment plate having a socket insertion hole having socket insertion hole sidewalls;
a socket inserted in the socket insertion hole, wherein the socket includes a first housing, a second housing and a stepped portion disposed between the first housing and the second housing;
a lamp attached to the socket;
an LCD panel configured to transmit light emitted from the lamp and to display an image; and
a bottom chassis to which the alignment plate is attached;
wherein at least one projection is formed on an inner surfaces of the socket insertion hole sidewall and wherein the stepped portion of the socket contacts the projection,
wherein the thickness of the projection gradually increases downwardly and the thickness of the top portion of the projection is thinner than the thickness of the bottom portion of the projection.

14. A liquid crystal display (LCD) comprising:
an alignment plate having a socket insertion hole having socket insertion hole sidewalls;
a socket inserted in the socket insertion hole, wherein the socket includes a first housing, a second housing and a stepped portion disposed between the first housing and the second housing;
a lamp attached to the socket;
an LCD panel configured to transmit light emitted from the lamp and to display an image; and
a bottom chassis to which the alignment plate is attached;
wherein at least one projection is formed on the stepped portion of the socket and wherein inner surfaces of the socket insertion hole sidewalls come into contact with the at least one projection, and
wherein the thickness of the at least one projection is tapered, the thickness of the projection gradually decreases downwardly from a top portion to a bottom portion, and the thickness of the top portion of the projection is thicker than the thickness of the bottom portion of the projection surface of the socket.

* * * * *